United States Patent
Ramus

(10) Patent No.: US 8,048,460 B2
(45) Date of Patent: Nov. 1, 2011

(54) BEVERAGE MAKER FLOW DETECTION LOGIC

(75) Inventor: Sebastien Ramus, Shawnee, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 224 days.

(21) Appl. No.: 11/841,142

(22) Filed: Aug. 20, 2007

(65) Prior Publication Data

US 2008/0050491 A1    Feb. 28, 2008

Related U.S. Application Data

(60) Provisional application No. 60/839,545, filed on Aug. 23, 2006.

(51) Int. Cl.
*A01K 43/00*    (2006.01)

(52) U.S. Cl. ....... 426/231; 426/520; 426/433; 99/323.3; 99/281

(58) Field of Classification Search .................. 426/520, 426/231; 99/323.3, 282, 280, 281
See application file for complete search history.

(56) References Cited

U.S. PATENT DOCUMENTS

| | | | | |
|---|---|---|---|---|
| 4,603,621 A | | 8/1986 | Roberts | |
| 4,978,833 A | * | 12/1990 | Knepler | 392/449 |
| 5,285,717 A | * | 2/1994 | Knepler | 99/282 |
| 2003/0033867 A1 | | 2/2003 | Posey et al. | |
| 2005/0160918 A1 | * | 7/2005 | Winstanley et al. | 99/279 |
| 2006/0130908 A1 | * | 6/2006 | Marty et al. | 137/613 |

FOREIGN PATENT DOCUMENTS

| | | |
|---|---|---|
| FR | 2 714 955 A1 | 7/1995 |
| GB | 2 098 708 A | 11/1982 |
| GB | 2 108 249 A | 5/1983 |

* cited by examiner

*Primary Examiner* — Rena Dye
*Assistant Examiner* — Preston Smith
(74) *Attorney, Agent, or Firm* — Fulwider Patton LLP

(57) ABSTRACT

The water heating flow detection system for a beverage maker includes a heater control logic circuit that controls heating in response to temperature and flow conditions in the beverage maker. A heater control logic circuit receives a temperature detection signal and a flow detection signal, and generates a water heater control signal for controlling operation of one or more water heaters. A flow detection device may be connected to the hot water outlet conduit or the cold water inlet conduit, and may include a magnetic flow detection device. A faucet lever position detection device may also be used to indicate flow through a faucet outlet valve.

1 Claim, 3 Drawing Sheets

BEVERAGE MAKER FLOW DETECTION LOGIC

CROSS-REFERENCE TO RELATED APPLICATIONS

This application is based upon Provisional Application No. 60/839,545, filed Aug. 23, 2006.

BACKGROUND OF THE INVENTION

The present invention relates generally to the field of beverage makers, coffee makers, water heaters, and water boilers, and more particularly relates to a flow detection logic for a beverage maker.

Certain water boilers, water heaters, coffee makers or the like, hereafter referred as "units," use a manual faucet or tap to dispense hot water. In these units, the control circuitry that controls heating of the water does not initiate heating of the water as soon as water is being dispensed. These units' control circuits solely rely on detection of the temperature of the water in the tank to turn the heaters on and off. In these units, the heaters are turned on only when the detected water temperature inside the tank falls below a pre-set limit. As a result, the control circuitry can not anticipate the need for heating the water. The drawback of this approach is that it creates a delay between the time when water is being withdrawn, and when the heaters are turned on.

In an attempt to overcome the problem of delay between dispensing of hot water and heating of water, current units are often equipped with a device called an "anticipator tube" as is illustrated in FIG. 1, showing a prior art water heating system 10 for a beverage maker unit, which typically includes a water tank 12 enclosing an interior chamber 14, and a cold water inlet conduit 16 connected to the water tank, with the anticipator tube 18 connected to the cold water inlet conduit. A hot water outlet conduit 20 is connected to the water tank and includes a manual hot water faucet outlet valve 22 with a faucet lever 24 for operating the manual hot water faucet outlet valve. The faucet lever is typically movable between a faucet outlet valve open position and a faucet outlet valve closed position. A temperature measuring device 26 is also provided in the tank adjacent to an outlet end of the anticipator tube, so that as cold water is supplied to the water tank, the anticipator tube introduces cold water into the water tank near the temperature measuring device, lowering the water temperature in the vicinity of the temperature measuring device. One or more heaters 28 are connected to a heater control logic unit 30 which receives a temperature signal from the temperature measuring device, so that when cold water is flowing into the unit to replace water being dispensed from the unit, cold water is directed onto the temperature measuring device to artificially lower its temperature, hence turning the heaters on earlier. The drawbacks of this concept are the following:

First, for this system to be effective, cold water is to be sprayed near the temperature measuring device, which is often located at the top of the water tank, close to the hot water outlet. As a result, the cold water introduced at the top of the water tank by the anticipator tube reduces the water outlet temperature, which is not a desired effect.

Second, as the cold water from the anticipator tube mixes with the hot water around the temperature measuring device, the temperature around the temperature measuring device drops fairly slowly. As a result, it often takes 15 to 40 seconds of cold water flow from the anticipator tube for the unit's control circuit to turn the heaters on. This delay causes the overall temperature in the tank to drop more rapidly, and also increases the overall re-heating time.

Third, the orientation and location of the anticipator tube has to be adjusted so the right amount of cold water is sprayed on the temperature measuring device. Not enough cold water sprayed onto the temperature measuring device would render the water heating system ineffective, and too cold water sprayed onto the temperature measuring device much would eliminate completely the temperature sensing capabilities of the unit control circuitry, potentially causing over-heating of water in the tank. This adjustment is not only required at the factory, but is also required throughout the life of the product, hence increasing the manufacturing, maintenance and repair costs.

It would therefore be desirable to eliminate these performance drawbacks. The present invention addresses and solves these and other problems associated with heating of water in a beverage maker.

SUMMARY OF THE INVENTION

Briefly, and in general terms, the present invention provides for a system for detecting fluid flow to or from a beverage makers water heating system and providing a flow detection signal to the beverage maker's logic to improve performance of a beverage maker's water heating system. Calculations have shown that detecting the need for reheating water in the beverage maker's water heating tank as soon as hot water is drawn from the tank can improve the production of hot water by 15 to 25%. This improved performance increases the value of the product to the end user.

The present invention accordingly provides for a water heating flow detection system for a beverage maker that includes a heater control logic circuit that controls heating of water in response to temperature flow conditions in the beverage maker, so that heating of water in the beverage maker can be carried out efficiently, as needed. The beverage maker typically includes a water tank having an interior chamber, a cold water inlet conduit connected in fluid communication with the interior chamber for supplying water to the water tank, and a hot water outlet conduit connected in fluid communication with the interior chamber for dispensing heated water from the water tank. The hot water outlet conduit includes a manual hot water faucet outlet valve having a faucet lever movable between a faucet outlet valve open position and a faucet outlet valve closed position. Typically the water tank includes one or more water heaters associated with the water tank for heating water in the water tank, and a temperature measuring device associated with the water tank for measuring a water temperature and for generating a temperature detection signal.

According to the present invention, a flow detection device is operatively connected to the beverage maker for detecting flow in at least a portion of the beverage maker for generating a flow detection signal. In one preferred aspect, an outlet flow detection device may be connected to the hot water outlet conduit for detecting flow in the hot water outlet conduit, or an inlet flow detection device may be connected to the cold water inlet conduit for detecting flow in the cold water inlet conduit. In another preferred aspect, the flow detection device may include a faucet lever position detection device connected to the faucet lever for detecting whether the faucet outlet valve is in the open position or the closed position, and generating a faucet lever position signal indicating flow through the faucet outlet valve when the faucet outlet valve is in the open position.

In the outlet flow detection device or the inlet flow detection device, the flow detection device may be a magnetic flow detection device that includes a flow switch sensor housing including a flow sensor chamber operatively connected to the hot water outlet conduit, and a magnet retained in the flow sensor chamber and movable within the flow sensor chamber between a non-flow sensing position at a first end of the flow sensor chamber and a flow sensing position at a second end of the flow sensor chamber. The magnet moves to the flow sensing position responsive to flow within the flow sensor chamber, while a return spring disposed in the flow sensor chamber biases the magnet toward the non-flow sensing position in the absence of flow within the flow sensor chamber. A magnetic detection sensor is disposed adjacent to the second end of the flow sensor chamber for detecting the magnet and generating the flow detection signal when the magnet is in the flow sensing position.

A heater control logic circuit is operatively connected to the temperature measuring device and the outlet flow detection device for receiving the temperature detection signal and the flow detection signal. The heater control logic circuit is also operatively connected to the one or more water heaters and generates a water heater control signal for controlling operation of the one or more water heaters responsive to the temperature detection signal and the flow detection signal.

The present invention also provides for a method of controlling heating of water in a beverage maker, including the steps of measuring a temperature of water in the water tank of the beverage maker and generating a temperature detection signal indicative of the temperature, and detecting flow in at least a portion of the beverage maker and generating a flow detection signal indicative of the flow. A heater control logic circuit receives the temperature detection signal and the flow detection signal, and generates a water heater control signal for controlling operation of the one or more water heaters responsive to the temperature detection signal and the flow detection signal. Flow in at least a portion of the beverage maker may be detected by a flow detection device in the hot water outlet conduit or in the cold water inlet conduit. Flow may also be detected by detecting whether the faucet outlet valve is in the open position or the closed position, and generating a faucet lever position signal indicating flow through the faucet outlet valve when the faucet outlet valve is in the open position.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
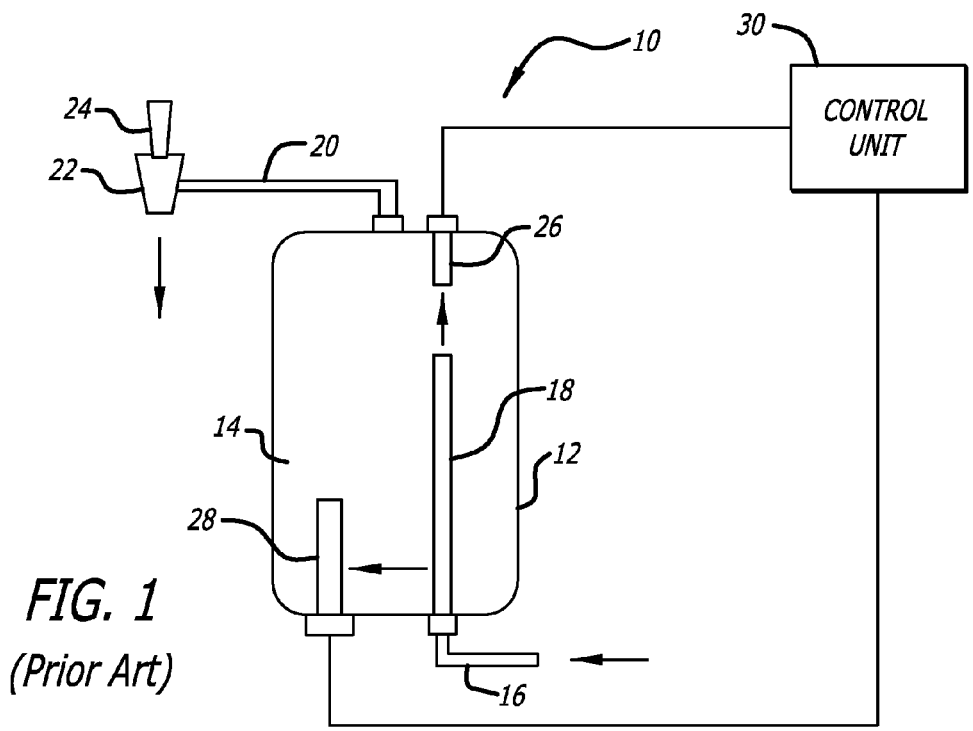
FIG. 1 is a schematic diagram of a typical prior art beverage maker water heating system.

Referring to the drawings, which are provided for purposes of illustration by way of example, and not by way of limitation, the present invention provides a system for detecting fluid flow and providing a flow detection signal to a beverage maker's logic to improve performance of a beverage maker's water heating system.

The water heating flow detection system of the invention provides an additional input signal to the beverage maker's water heating unit's control circuitry to anticipate the need for re-heating. The input signal is based on whether or not water is flowing through the water heating system. This signal can be created by either directly sensing the water flow by a flow detection device such as a flow switch or a flow meter, for example, or by detecting the position of a manual faucet lever or other flow control valve (e.g. open or closed).

Figure 2:
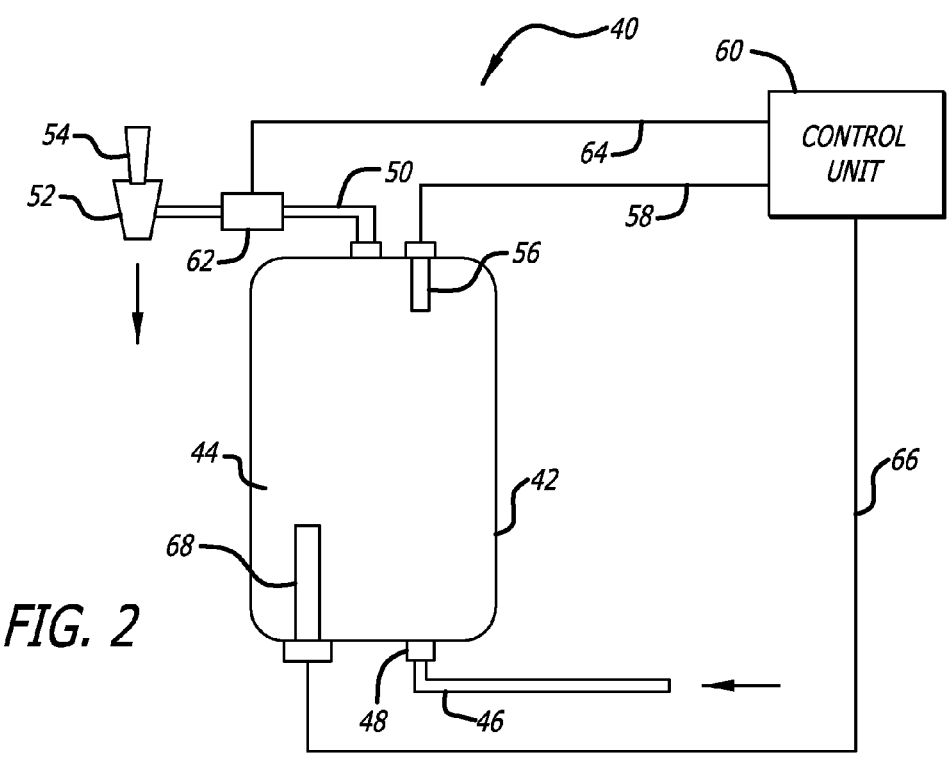
FIG. 2 is a schematic diagram of a first embodiment of a water heating system for a beverage maker, according to the present invention.

Accordingly, in a first presently preferred embodiment, illustrated in FIG. 2, the present invention provides for a water heating system 40 for a beverage maker including a water tank 42 enclosing an interior chamber 44. A cold water inlet conduit 46 is connected in fluid communication with the water tank at a cold water inlet port 48 of the water tank, and a hot water outlet conduit 50 having a manual hot water faucet outlet valve 52 is similarly connected in fluid communication with the water tank. The manual hot water faucet outlet valve includes a faucet lever 54 for operating the manual hot water faucet outlet valve, which is movable between a faucet outlet valve open position and a faucet outlet valve closed position (not shown).

A temperature measuring device 56 is mounted within the water tank, and generates a temperature detection signal 58 that is received by a heater control logic circuit 60. An outlet flow detection device 62 is connected to the hot water outlet conduit for detecting flow in the hot water outlet conduit and generating a flow detection signal 64 that is received by the heater control logic circuit. The heater control logic circuit in turn generates a water heater control signal 66 that is received by and that controls the operation of one or more water heaters 68 associated with the water tank for heating water in the water tank responsive to the flow detection signal and the temperature detection signal.

Figure 3:
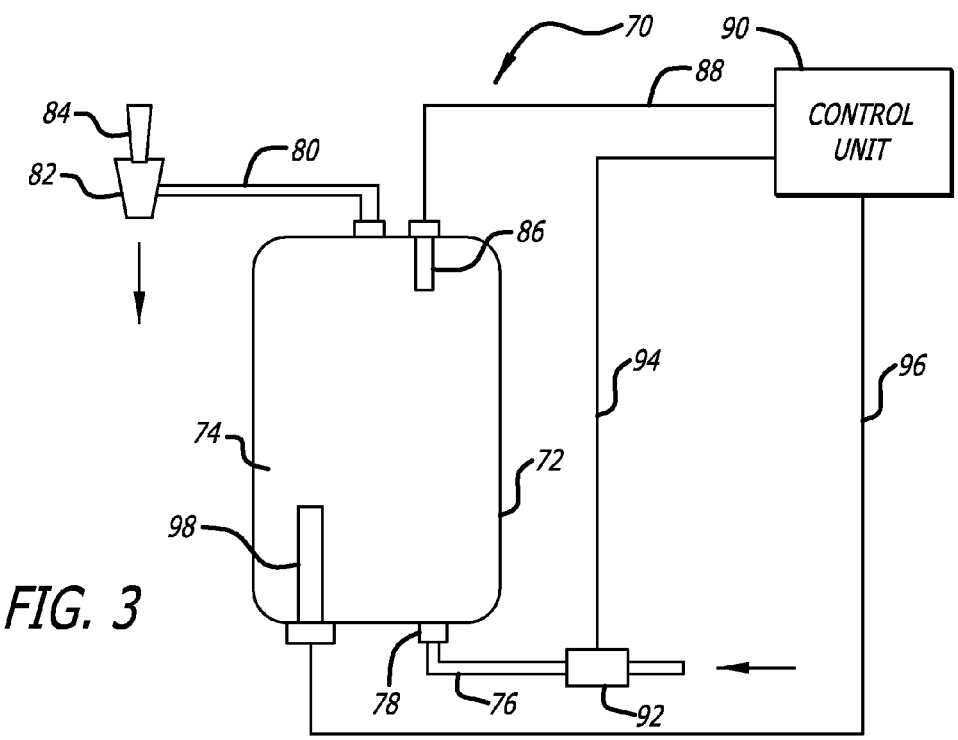
FIG. 3 is a schematic diagram of a second embodiment of a water heating system for a beverage maker, according to the present invention.

Referring to FIG. 3, in a second presently preferred embodiment, the present invention provides for a water heating system 70 for a beverage maker including a water tank 72 having side walls enclosing an interior chamber 74. A cold water inlet conduit 76 is connected in fluid communication with the water tank at a cold water inlet port 78 of the water tank, and a hot water outlet conduit 80 similarly is connected in fluid communication with the water tank for supplying heated water from the water tank. The hot water outlet conduit includes a manual hot water faucet outlet valve 82 having a faucet lever 84 for operating the manual hot water faucet outlet valve. The faucet lever is movable between a faucet outlet valve open position and a faucet outlet valve closed position (not shown).

A temperature measuring device 86 is also mounted in the water tank for generating a temperature detection signal 88 that is received by a heater control logic circuit 90. An inlet flow detection device 92 is also provided that is connected to the cold water inlet conduit for detecting flow in the cold water inlet conduit and generating a flow detection signal 94 that is received by the heater control logic circuit, which in turn generates a water heater control signal 96 responsive to the flow detection signal and the temperature detection signal that is received by and that controls the operation of one or more water heaters 98 associated with the water tank for heating water in the water tank.

Figure 4:
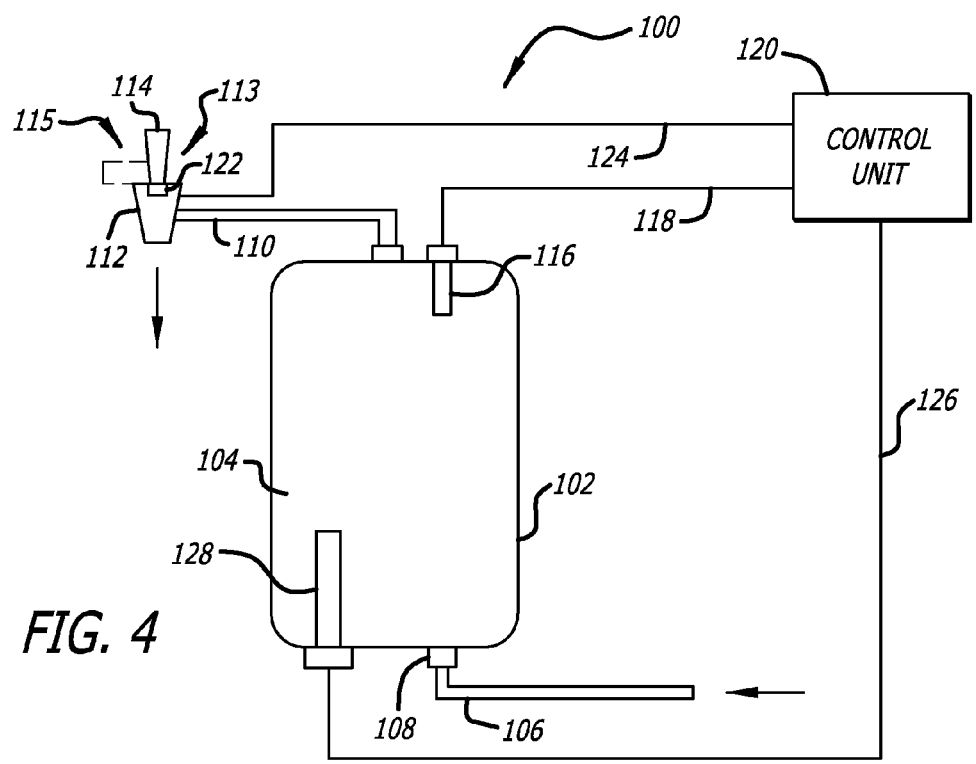
FIG. 4 is a schematic diagram of a third embodiment of a water heating system for a beverage maker, according to the present invention.

Referring to FIG. 4, in a third presently preferred embodiment, the present invention provides for a water heating system 100 for a beverage maker having a water tank 102 with side walls enclosing an interior chamber 104, a cold water inlet conduit 106 connected to the water tank at a cold water inlet port 108 of the water tank, and a hot water outlet conduit 110 connected to the water tank for supplying heated water from the water tank through a manual hot water faucet outlet valve 112. The manual hot water faucet outlet valve includes a faucet lever 114 for operating the manual hot water faucet outlet valve, and as is illustrated in FIG. 4, the faucet lever is movable between a faucet outlet valve open position 113 and a faucet outlet valve closed position 115.

A temperature measuring device 116 is mounted in the water tank, and generates a temperature detection signal 118 that is received by a heater control logic circuit 120. A faucet lever position detection device or switch 122 is connected to the faucet lever for detecting whether the faucet outlet valve is in the open position or the closed position, and for generating a faucet lever position signal 124 indicating whether the faucet outlet valve is in the open position or the closed position. The faucet lever position signal is received by the heater control logic circuit, which in turn generates a water heater control signal 126 received by one or more water heaters 128 associated with the water tank for heating water in the water tank, for controlling the operation of the one or more water heaters, responsive to the faucet lever position signal and the temperature detection signal.

Figure 5:
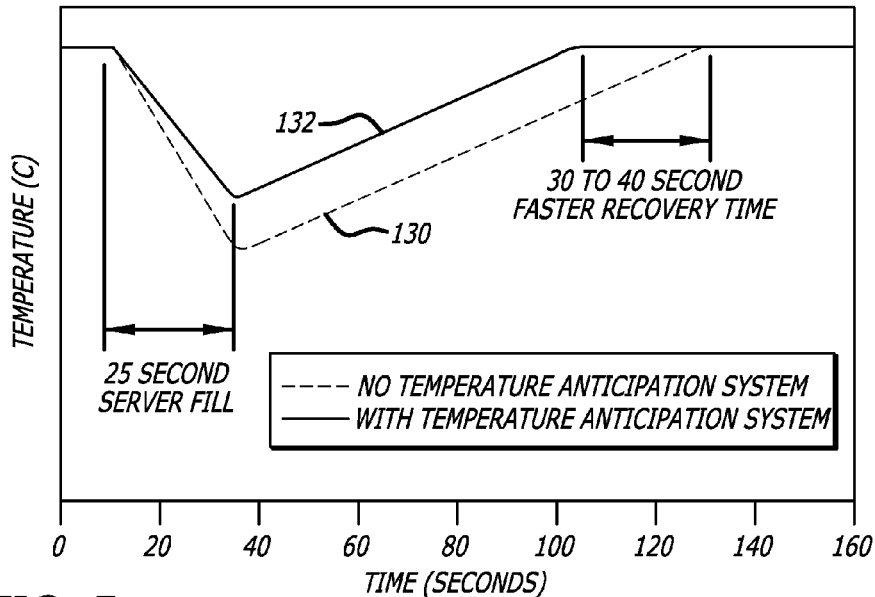
FIG. 5 is a graph illustrating the overall benefits of the beverage maker water heating anticipation method and system according to the present invention.

The graph in FIG. 5 illustrates the overall benefits of the anticipation system of the present invention. In the example illustrated in FIG. 5, a large water heating tank was connected to the logic controller (PCB) of a coffee maker. A flow switch was connected in-line on the cold water inlet. The flow switch was connected to the coffee maker PCB such that the heaters were turned on as soon as the flow switch detected flow. In the graph, the line 130 represents water heater tank water temperature over a period operation of a prior art water heater tank during and after a server draw (1.5 liters) off a 4.0 liter tank, not using the temperature anticipation system of the invention. The line 132 represents water heater tank water temperature over the same period of operation for a water heater system, during and after a server draw (1.5 liters) off a 4.0 liter tank, utilizing the temperature anticipation system of the invention. It should be readily apparent that by being able to sense/detect whether or not the unit is flowing, the electronic controller of the present invention can turn the heaters on immediately to not only increase the overall water temperature of the hot water draw, but also to improve significantly the recovery time of the unit.

Figure 6:
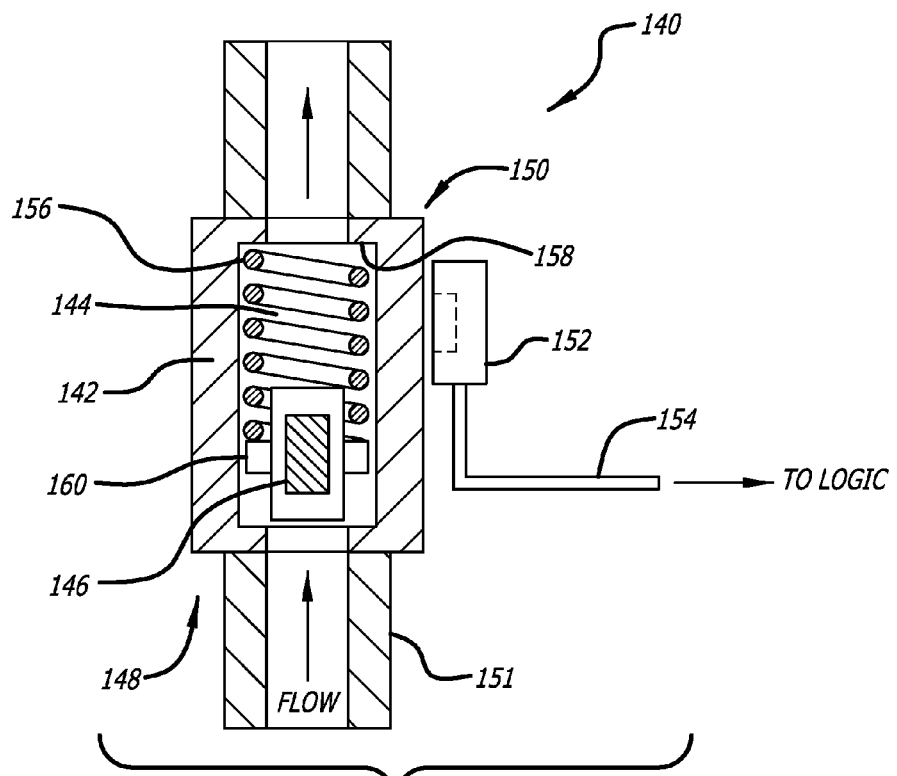
FIG. 6 is a schematic diagram of a flow switch sensor adapted for use as a flow detection device in the system according to the present invention.

Various types of flow detection devices may be used in the present invention. For example, the flow detection device may be a magnetic flow detection device 140 illustrated in FIG. 6, including a flow switch sensor housing 142, typically formed of plastic tubing, which defines a flow sensor chamber 144 confining a magnet 146 constructed to be carried along within the chamber by water flow through the housing, and movable between a non-flow sensing position at a first end 148 of the flow sensor chamber and a flow sensing position at a second end 150 of the flow sensor chamber. When water flows through a conduit 151 and through the flow sensor chamber, the magnet is displaced. A magnetic detection sensor 152 detects the presence or absence of a magnetic field (reed switch) at the flow sensing position at a second end of the flow sensor chamber, and sends a logic signal 154 (typically a "0" or "1") to the electronic circuitry. The magnet is biased to be reset in its "no flow" position with a return spring 156 disposed in the flow sensor chamber and situated between a flow sensor chamber interior flange 158 and an exterior flange 160 on the magnet, although when the magnetic flow switch sensor is vertically oriented, the magnet may be reset in its "no flow" position by the force of gravity.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A method of controlling heating of water in a beverage maker, the beverage maker including a water tank having an interior chamber, a water inlet conduit connected in fluid communication with the interior chamber for supplying water to the water tank, a water outlet conduit connected in fluid communication with the interior chamber for supplying heated water from the water tank, the water outlet conduit including a manual water faucet outlet valve having a faucet lever movable between a faucet outlet valve open position and a faucet outlet valve closed position, and at least one water heater associated with said water tank for heating water in said water tank, the steps of method comprising:
    measuring a temperature of water in a water tank of a beverage maker and generating a temperature detection signal indicative of said temperature;
    detecting whether the faucet outlet valve is in the open position or the closed position, and generating a faucet lever position signal indicating flow through the faucet outlet valve when the faucet outlet valve is in the faucet outlet valve open position; and
    providing a heater control logic circuit receiving said temperature detection signal and said faucet lever position signal, and generating a water heater control signal for controlling operation of at least one water heater of the beverage maker responsive to said temperature detection signal and said faucet lever position signal.

* * * * *